(No Model.) 2 Sheets—Sheet 1.
A. C. ROGERS.
FRICTION CLUTCH.
No. 370,821. Patented Oct. 4, 1887.
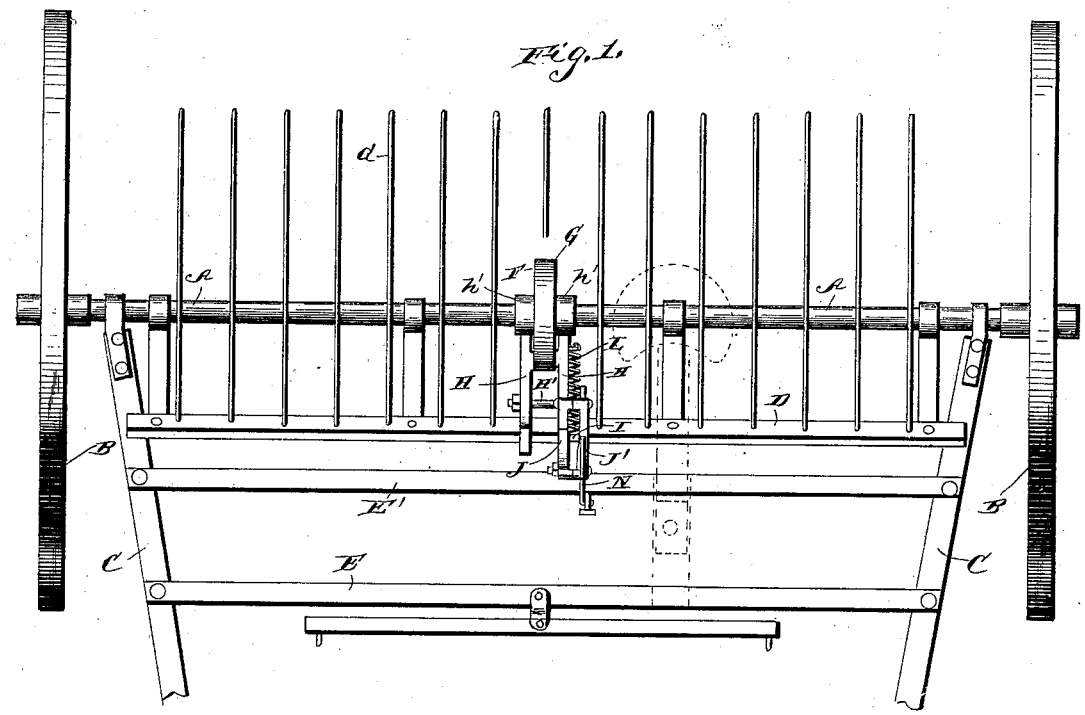
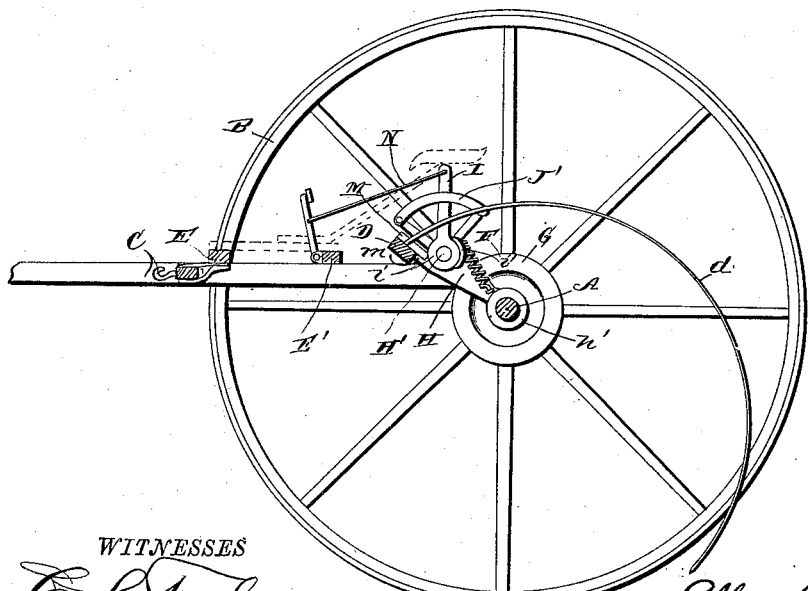
WITNESSES
INVENTOR
Albert C. Rogers
by C. L. Snowden
Attorneys (No Model.) 2 Sheets—Sheet 2.
A. C. ROGERS.
FRICTION CLUTCH.
No. 370,821. Patented Oct. 4, 1887.
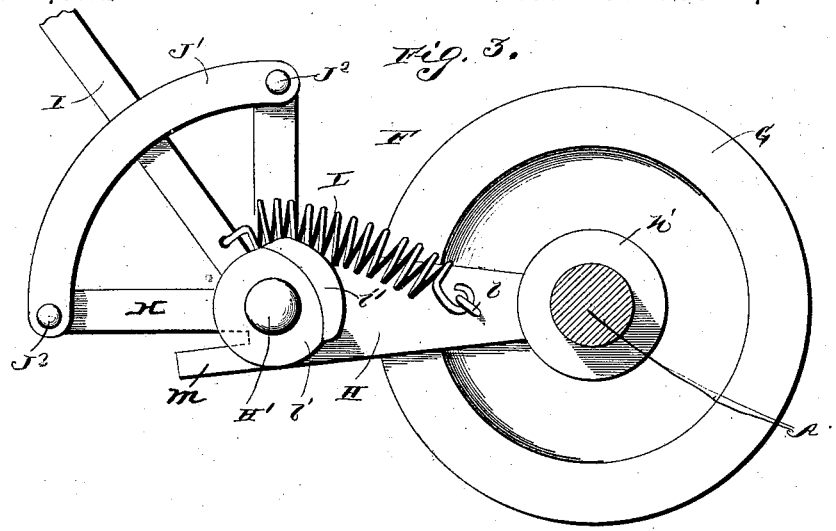
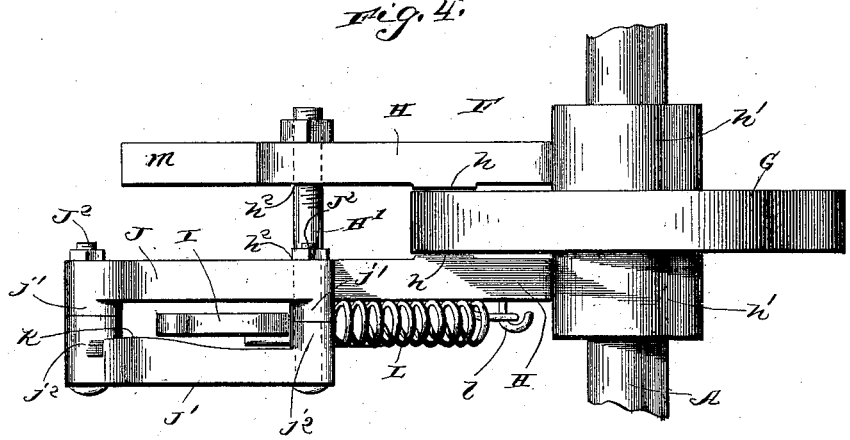
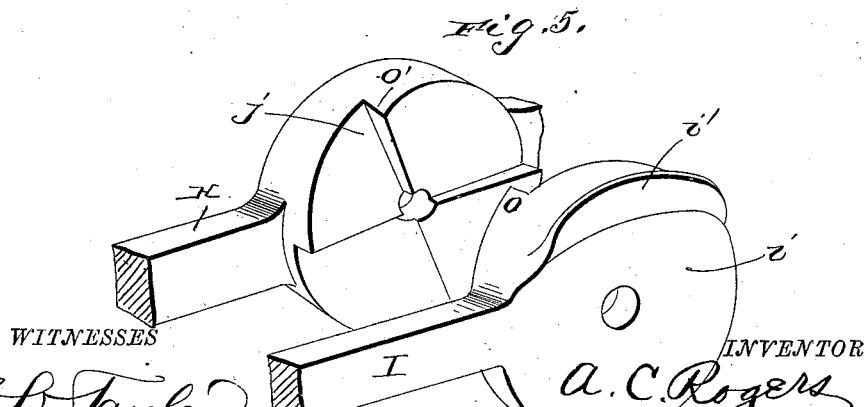
WITNESSES
INVENTOR
A. C. Rogers

UNITED STATES PATENT OFFICE.

ALBERT C. ROGERS, OF ALFRED, NEW YORK.

FRICTION-CLUTCH.

SPECIFICATION forming part of Letters Patent No. 370,821, dated October 4, 1887.

Application filed May 6, 1887. Serial No. 237,351. (No model.)

*To all whom it may concern:*

Be it known that I, ALBERT C. ROGERS, a citizen of the United States, residing at Alfred, in the county of Allegany and State of New York, have invented a new and useful Improvement in Friction-Clutches for Hay-Rakes and other Machinery, of which the following is a specification.

My invention relates to improvements in friction-clutches for hay-rakes and other machinery; and it consists of the peculiar combination and novel construction and arrangement of the various parts for service, substantially as hereinafter fully described, and particularly pointed out in the claims.

The primary object of my invention is to provide an improved friction-clutch especially adapted for horse hay-rakes, which shall instantly and readily respond to the movement of the operating-lever to apply the clutch and thus retard the movement of the rake-head and teeth thereon, and to so arrange and dispose the parts of the said clutch that the wear will take place evenly on all the moving parts thereof.

A further object of my invention is to provide the clutch with means whereby the parts can be adjusted to vary the power of the device, and to improve the parts in minor details, so that it shall possess superior advantages in points of simplicity, strength, and durability of construction, ease and effectiveness of operation, and cheapness of manufacture.

In the accompanying drawings I have shown my improved clutch applied to a horse hay-rake of any approved pattern; but I would have it understood that I do not intend to confine myself to the use of my invention in this particular class of devices, as I am aware that it can be used in any art where it is desirable to use a clutch with equal advantages and efficiency.

Figure 1 is a top plan view of the horse hay-rake, and Fig. 2 is a side elevation thereof, with my improved friction-clutch applied thereto. Fig. 3 is an enlarged detail view, in side elevation, of the clutch detached from the hay-rake. Fig. 4 is a top or plan view thereof. Fig. 5 is a detail view of the boss $i$ of the lever and boss $j$ of the friction-plate.

Referring to the drawings, in which like letters of reference denote corresponding parts in all the figures, A designates the axle of the horse hay-rake; B, the carrrying-wheels; C, the thills, which are loosely connected with the axle; D, the rake-head carrying the rake-teeth $d$, and E E' the cross-bars connecting the thills in front of the rake-head, all of which are of any approved or preferred pattern, and need not therefore be herein more fully and specifically described, as my invention is applicable to any class of rakes.

F designates the friction-clutch of my invention, which is applied to the axle and rake-head of the machine for retarding the movement of the latter and thereby holding the teeth carried thereby at any desired elevation and adjustment; and my said invention consists, essentially, of a rotary wheel, G, which is affixed to and rotates with the axle of the rake, the friction-plates H for binding upon the sides of the rotary wheel and clamp the latter against rotation, an operating-lever, I, for moving the friction-plates toward each other and to simultaneously apply the device, and a spring for automatically returning the lever to a position wherein the friction-plates are out of contact with the rotary wheel and thereby normally release the device, the peculiar construction of which parts I will now proceed to describe in detail.

The friction-wheel G is affixed or secured to the axle of the machine by any preferred or suitable means, so that it will rotate with the axle, and the said wheel is provided with a smooth plain periphery and sides, as shown, for a purpose presently described. The friction-plates H are arranged on opposite sides of the wheel, and at or near their middle and on their opposing faces they are provided with integral ribs or projections $h$, which impinge or bear upon the plane smooth sides of the friction-wheel and firmly clamp or hold the latter against movement when the operating-lever is adjusted to force the said ribs into contact with the wheel. Said plates are capable of a limited movement or play laterally relatively to each other and to the friction-wheel, which is arranged between the same in order to apply and release the said plates to and from the wheel, and the plates are provided at one end with integral hubs or enlargements $h'$, through which the axle B of the machine passes, the diameter of the opening in the hubs being a little greater than the diameter of the axle, so that a limited play is permitted the hubs and their plates. Each of the friction-plates is provided near its outer end with a transverse opening, $h^2$, through which passes a threaded connecting-bolt, H', one end of which has the usual head, which bears against one of the plates, and the other threaded end receives a nut or burr, by which the friction-plates can be drawn together or loosened to vary the force which the friction-plates exert upon the sides of the rotary wheel, as will be very readily understood. One of the friction-plates is extended beyond the other plate of the pair, for a purpose presently described, and the said plate is further provided with a boss or shoulder, $j$, the exposed outer faces of which are inclined or beveled, and against which the inclined faces of a boss, $i$, on the lower end of the operating-lever I take or bind in a manner presently described, the said lever being held in position by the same bolt that secures the friction-plates together, as shown.

J J' designate segmental guides, between which the free end of the operating-lever works and is guided. One of these guides— the guide J—is formed or cast integral with the plate H, which is extended beyond the fellow friction-plate, hereinbefore referred to. The guide J is arranged in line with the friction-plate, with which it is cast, and at its ends it has projecting lugs $j'$, which bear or impinge against similar lugs, $j^2$, of the guide J'. These lugs of the segmental guides are provided with aligned openings, through which are passed bolts $J^2$, that detachably secure the said guides together, and also connect the guide J' with one of the friction-plates. The guide J' is provided on its inner face or side with an inclined cam rib or flange, $k$, on which rides the end of the operating-lever I when the latter is moved to operate the device, and a notch is formed in rear of the said inclined rib $k$, into which the end of the operating-lever fits or catches when the friction-plates are applied to the rotary wheel, to prevent the said lever from retrograde movement. The boss or head $i$ of the operating-lever is provided with an integral guide flange or rib, $i'$, on one side, in which fits the coiled retracting-spring L for returning the lever to its normal position when disengaged from the notch of the segmental guides to release the friction-plates from the wheel, one end of this coiled spring being secured to the operating-lever, near its boss or head, and the other end of the spring to a perforated lug or staple, $l$, of one of the friction-plates.

M designates a holding-plate that is affixed or secured in any suitable manner upon the rake-head D of the machine, and one edge of this plate projects in rear of the rake-head, so that fingers or projections $m$ on the lower under sides of the friction-plates can take or fit under the said projecting edge of the holding-plate. This plate M serves to prevent the front ends of the friction-brake, the guides, and the lever connected with the plates from accidental movement and displacement, while at the same time the friction-plates are free to move laterally of each other, as is necessary in applying the said plates to and releasing them from the rotary wheel, and the rear ends of the said friction-plates are supported by the axle, and prevented from lateral displacement on the axle by the rotary wheel between the enlarged hubs $h$ thereof.

N designates a cord, rope, or other device, which is connected to the free end of the operating-lever at one end and at its other end to a foot-lever on the machine, or to the standard of the seat, so that the driver on the seat can operate the device with his foot and without moving from his seat.

This being the construction of my improved friction-clutch, the operation thereof is as follows: The operating-lever I is normally drawn or forced rearward by the retracting-spring, and the rearward movement of the said lever is limited by the stop-shoulders $o$ on the head thereof coming in contact with similar shoulders, $o'$, on the inclined face of the boss of one of the friction-plates. When the lever is in this position, the free end thereof is out of contact with the inclined cam-rib $k$ of the guide J', and the friction-plates are free to move or play laterally of each other, so that they are released from the rotary-wheel G, which is thus free to rotate or turn with the axle of the machine. To operate the clutch and thereby hold the rake-head at any desired position and the teeth thereon at an elevation above the ground, the operating-lever is thrown forward to cause its free end to ride upon the inclined cam-rib $k$, thereby forcing the head of the lever outwardly and drawing upon the connecting-bolt H' to draw the friction-plates H together and force their projections or ribs upon the smooth plain sides of the rotary wheel. The inclined cam-faces of the boss on the friction-plate and the enlarged head of the lever ride upon each other to cause the lever to more effectively and positively operate the friction-plates, and when the free end of the lever passes the enlarged end of the cam-rib it takes into the notch on one of the guides to prevent retrograde movement of the lever, which would release the friction-plates. To release the clutch it is only necessary to reverse the lever, which operation is assisted by the spring, to more effectively draw or force the plates apart and out of contact with the rotary-wheel, and this reverse movement of the lever is limited by the shoulders $o$ $o'$ coming in contact with each other.

It will thus be seen that I provide an improved clutch which is very simple, strong, and durable in construction, easy and effective of operation, and cheap of manufacture. The friction-plates of the clutch respond instantly to the movement of the lever.

Having thus fully described my invention, what I claim as new, and desire to secure by Letters Patent, is—

1. The combination of a shaft, the rotary wheel affixed to the shaft, the friction-plates fitted loosely on the shaft and arranged on opposite sides of the rotary wheel thereon, and a lever connected with the friction-plates to simultaneously operate the same to move them parallel with the axis and thereby draw the plates together and upon the sides of the rotary wheel, substantially as described, for the purpose set forth.

2. The combination of a shaft, the rotary wheel affixed thereto, the friction-plates loosely mounted on said shaft on opposite sides of the rotary wheel, a bolt arranged parallel with said shaft and connecting the plates, and a swinging operating-lever connected to the bolt, substantially as described.

3. The combination of a shaft, a rotary wheel thereon, the laterally-movable friction-plates loosely mounted on said shaft on opposite sides of the wheel, a swinging lever connected with the friction-plates, and a guide for the lever, having a cam against which the lever impinges in its movements, substantially as described, for the purpose set forth.

4. In a clutch, the combination of the rotary wheel and its shaft, the friction-plates loosely mounted on said shaft on opposite sides of the wheel, a bolt connecting the plates, the guides carried by one of the plates, and a swinging lever connected with the bolt and arranged between the guides, substantially as described.

5. In a clutch, the combination of a rotary wheel, the friction-plates arranged on opposite sides of the wheel and movable laterally of each other, the segmental guides carried by one of the plates and having a cam-rib, a swinging lever connected with the friction-plates and arranged between the guides to impinge upon the cam-rib thereon, and a spring for withdrawing the lever from contact with the cam-rib, substantially as described.

6. In a clutch, the combination of a shaft, the rotary wheel carried by the shaft, the laterally-movable friction-plates arranged on opposite sides of the wheel and having the projections arranged on their opposing faces to bear upon the sides of the wheel, the through-bolt connecting the plates, the segmental guides carried by one of the plates and having an inclined rib, the swinging lever fitted on one end of the through-bolt and arranged between the guides to impinge upon the inclined rib thereon, and a spring connected to the lever and one of the friction-plates to normally withdraw the lever from contact with the cam-rib, substantially as described, for the purpose set forth.

In testimony that I claim the foregoing as my own I have hereto affixed my signature in presence of two witnesses.

ALBERT C. ROGERS.

Witnesses:
E. E. HAMILTON,
C. D. REYNOLDS.